United States Patent
Rasti

(10) Patent No.: US 8,069,256 B2
(45) Date of Patent: Nov. 29, 2011

(54) SYSTEM AND METHOD TO CURB IDENTITY THEFT

(76) Inventor: Mehran Randall Rasti, Baton Rouge, LA (US)

( * ) Notice: Subject to any disclaimer, the term of this patent is extended or adjusted under 35 U.S.C. 154(b) by 1335 days.

(21) Appl. No.: 11/506,476

(22) Filed: Aug. 19, 2006

(65) Prior Publication Data

US 2007/0050638 A1    Mar. 1, 2007

Related U.S. Application Data

(60) Provisional application No. 60/710,693, filed on Aug. 23, 2005.

(51) Int. Cl.
*G06F 7/04* (2006.01)
(52) U.S. Cl. .............. 709/229; 709/230; 726/4
(58) Field of Classification Search .......... None
See application file for complete search history.

(56) References Cited

U.S. PATENT DOCUMENTS

| | | | | |
|---|---|---|---|---|
| 6,005,939 A | * | 12/1999 | Fortenberry et al. | 705/76 |
| 6,449,621 B1 | * | 9/2002 | Pettovello | 726/26 |
| 2002/0083008 A1 | * | 6/2002 | Smith et al. | 705/64 |
| 2003/0074564 A1 | * | 4/2003 | Peterson | 713/182 |
| 2004/0193882 A1 | * | 9/2004 | Singerle, Jr. | 713/168 |
| 2006/0034494 A1 | * | 2/2006 | Holloran | 382/116 |
| 2006/0200671 A1 | * | 9/2006 | Ishigaki et al. | 713/176 |
| 2007/0055672 A1 | * | 3/2007 | Stevens | 707/10 |
| 2008/0022414 A1 | * | 1/2008 | Cahn et al. | 726/28 |
| 2009/0006124 A1 | * | 1/2009 | Sinclair et al. | 705/1 |

FOREIGN PATENT DOCUMENTS

WO    WO 0152023 A1  *  7/2001
WO    WO 2005022428 A1  *  3/2005

* cited by examiner

*Primary Examiner* — Patrice Winder

(57) ABSTRACT

Personal identity-identifiers such as social security numbers, finger prints, and biometric identifiers are fixed for life; once disclosed they cannot reliably be used to authenticate the identity of a person claiming to own the identity-identifier(s). This limitation is overcome by introduction of one or more identity-passwords that are related, attached, or commingled together through a preset "rule". Authentication methodologies claimed by this invention use a three-way-cross-authentication among three entities; a person to be authenticated, an entity requesting the authentication, and a trustee that issues, keeps, and verifies identity-data. Such methodologies can trace back the entitlement of one or more identity-identifiers to its correct owner through a three-way-cross-match of its identity-passwords. Specific methods are described to authenticate one's social security number, credit card number, door pass, computer software licenses, and the like. Other methods are described that eliminates the need for business to ask for identity-identifiers.

9 Claims, No Drawings

SYSTEM AND METHOD TO CURB IDENTITY THEFT

CROSS REFERENCE TO RELATED APPLICATIONS

| 11/129,827 | May 16, 2005 | Mehran R. Rasti |
| 60/710,693 | Aug. 23, 2005 | Mehran R. Rasti |

This application claims the benefit of application Ser. No. 11/129,827 filed May 16, 2005, and U.S. Provisional Application No. 60/710,693 filed Aug. 23, 2005 the principals and contents of which are closely related to this application.

FEDERALLY SPONSORED RESEARCH OR DEVELOPMENT

Not Applicable

REFERENCES TO SEQUENCE LISTING, TABLES, OR COMPUTER PROGRAMS TABLES

Not Applicable

COMPUTER PROGRAMS

None

BACKGROUND OF INVENTION

1. Field of Invention

The invention introduces the term "personal identity-identifier". Personal identity-identifiers are of two types; those that are fixed over a person's entire life span, and those that change from time to time.

A person's social security number, for example, is a "fixed-for-life identity-identifier. Other examples of this sort are a person's finger print when it has been scanned and digitized into a computer-readable format, a digital representation of one's iris, ear lobe pattern, a piece of his/her DNA and other representative biometric data when stored in digital format.

Examples of semi-fixed identity-identifiers can be a credit card number, a door-access-code, a software-license-number, or any other identifier that attaches pre-defined access rights and/or privileges to a person based on his/her identity that is associated with who they are, where they work, and/or what and how much they paid for such an access right and privilege.

This invention presents a number of methods to curb the ever increasing instances of personal identity theft resulting from theft of various types of identity-identifiers. While the implementation of these methods vary slightly by what kind of identity-identifier we intend to protect, the underlying principal used remain the same. Protection begins by assigning one or more changeable "identity-passwords" to one or more of the identity-identifiers we are to protect. By assigning and appending a variable password to a fixed identity-identifier, we are in essence converting that fixed or semi fixed identifier to a variable data item. A first rule is "assignment" of two data to each other. A second rule might be a "concatenation" of data. A third "rule" for commingling a password with an identifier can be assigned as "encryption". A forth "rule" might be using two methods of encryption algorithms in series, and yet a fifth rule may be "concatenation" and "encryption" combined, and so forth. We are thus introducing a "rule flag" that holds a value indicating to a processor which rule, or what combinations of rules to apply when making a "complex-data-item" from identity-identifiers and identity-passwords.

We have outlined four separate sections under "Detailed Description" describing in detail how to properly authenticate the owner of a "partial" social security number, how to verify a credit card owner and the authenticity of a charge transaction, authentication of semi-fixed-identity-identifiers, and how to authenticate a person without asking a social security number, or other identifiers.

More emphasis has been placed on personal identity-authentication through use of social security number, since these days, it is used as the main key by which one is identified and is currently the only means of access into people's personal, financial, and credit history records. Unfortunately this number is used to also authenticate one's identity, since it is unique to a person and is fixed for life of that person. The very fact that SSN is not changeable, and at the same time is the key to a lots of information about a person has made every man, woman, and child in the United States venerable to identity theft and its misuse.

Soon to come is the same kind of problem when using digitized representation of one's finger print, iris, ear lope pattern, and other types of biometric data. The widespread use of computers and sharing of data will doom the usage of such novel identifiers, as they may seem today, as faulty as is usage of social security numbers is today.

Under this approach, an owner of an identity-identifier can change his/her identity-password after a single use or exposure. With this prerequisite, only a person having the same identity-identifier as its owner, along with the correct identity-password can be reliably authenticated.

2. Status of Prior Art

Social security number was not created to serve as a publicly used identity identifier, and was never intended to become people's national identification number in the United States. In recent times, it has wrongfully become the primary means of authenticating personal identity and a tool used in credit history checks. The computer age and mass storage of this identity-identifier had not been anticipated. Currently, the social security numbers of any person can be obtained and misused by any criminal who would be after it. Given time, other forms of identity-identifiers that look glamorous and sophisticated today, would follow the same fate, as the social security number. A few examples that can be mentioned are: digital finger prints, retina markings, ear lobe patterns, voice frequencies and inflections, or other biometric data, some of which are yet to be discovered and placed in use.

To date, no practical attempt has been made to place passwords on social security numbers, finger prints, and the like. Methodology and concepts that are introduced here can be utilized to protect and guard the usage of the social security number, credit card numbers, software access codes, door access codes, as well as many other identity-identifiers in use today, or soon to be in common place.

SUMMARY OF THE INVENTION

1. A trustee organization would be created with a secure web site and/or other automated means through which the general public would be able to present their identify identification credentials and to create one or more changeable identity-passwords.
2. This organization would also allow and facilitate legitimate recovery of lost or forgotten passwords and would accommodate the change of existing identity-passwords or regenerates a fresh set of them at any time—all done under secure conditions.

3. The trustee organization obtains its authority from its clientele by their joining a "personal membership club" through understanding, agreement, acceptance, and consent to a set of rules, conditions, and the extent of the trustee's liabilities towards them.

4. The client, or in this case the individual owner of the identity-passwords, will input and/or register the following information to trustee's web-site or other registration facilities through an application for membership. He/she shall read and agree to a set of rules, conditions, and its extent of liabilities affixed to the contract by the trustee's organization.

During the membership sign-on process, the person will:
 a. State his/her full name, along with
 b. address zip code,
 c. partial/full identity-identifier,
 d. applicant's e-mail and/or phone number,
 e. applicant's choice of identity-password(s),
 f. a "Master Password" being a phrase, word, number, and/or combinations thereof—to be used in the recovery and/or changing of an existing identity-password(s),
 g. credit card and payment information that are needed for the collection of membership and/or service fees, and/or
 h. any additional information as may be deemed necessary by the trustee.

5. As part of the identity-password registration process, the applicant must inform banks, financial institutions, or any other entities that would be authenticating the applicant's identity to the effect that his/her identity-identifier is passworded. Such an entity may be involved in obtaining the applicant's credit rating, credit history, and other financial/personal information, or it may need the authentication to grant him/her access or privileges. This can be done by sending a request to all of the known credit bureaus and/or institutional users of social security numbers and other identity-identifiers. The trustee makes available all required facilities for applicants to send and receive all required registration information, and shall provide all needed assistance in this process.

6. An entity fixing to authenticate the identity-identifier is notified to ask for the current identity-password from the owner of an identity-identifier in addition to a full or partial identity-identifier, itself. Such an entity subsequently contacts/or connects to the trustee facilities and initiates a verification process with a name, a current identity-password, and partial or full segments of an identity-identifier.

7. The receiving facility of the trustee will utilize the transmitted information and will blend them together using any commingling rules set in the making of a complex-data-item. The result is then compared with the person's complex-data-item on trustee's data-base. The identity of this person can thus be confirmed if and when the transmitted data matches that of an existing data in the same field of the trustee's data-base file.

8. The owner of the identity-password must keep his/her identity-password(s) secure, but accessible. The identity-owner will disclose his/her identity-password to legitimate third parties on need-to-know basis, and must change it after a one-time use and periodically, to keep the passwords safe from un-authorized use.

9. A third party, such as a financial institution that needs to authenticate a person's identity using identity-passwords will have to become a "business member" client of the trustee organization by reading and accepting a contract that specifies terms and conditions of the use and the extent of liabilities and damages the trustee would be responsible for.

10. The trustee may choose to impose membership and/or usage fees upon its business members, and hence may require enough information to authenticate the legitimacy and credit worthiness of such entities. The trustee may deny "business membership" to those entities it does not deem legitimate, or fit to work with at its sole judgment.

DESCRIPTION OF THE DRAWING

None

DETAILED DESCRIPTION

1. An organization referred to as "the trustee" issues a series of random identity-passwords or provides web and other electronic facilities through which its users are able to select and change their own identity-passwords. Identity-passwords are alphanumeric or digital characters; they are selectable and/or changeable at different time periods and after each use by their users. They are meant to safeguard the identity-identifiers of their users, and therefore must be treated as sensitive and protected data by their owners and those that manage and maintain them. Identity-identifiers are defined as being any numeric, or digital representation of their respective owners' identity, and/or access rights and privileges that the identity-owner is entitled to and/or is identified by. A very common identity-identifier in the United States is social security number (SSN). Another identity-identifier is a person's finger print that can be translated into digital format, be stored and transmitted as a digital file, and as such is subject to abuse; the same way SSN is today. Other identity-identifiers are iris markings, ear lobe patterns, any unique biometric data, full or partial DNA structures of a human body, and the like. These are all vulnerable to being stolen and misused when stored in digital file formats. Once in this form, they are also subject to being illegally copied, stored, transferred and misused as is SSN, today. One common attribute of all identity-identifiers mentioned thus far is the fact that they are "fixed-data" to identity a person, and remain fixed over the span of a person's life. Therefore when used, stored, copied, and transported through electronic media are no longer reliable metrics and tools for personal identity authentication—not unless they are accompanied by changeable passwords. The use of a fixed identity-identifier SSN as an authentication tool these days is the main reason why we see and hear about so many cases of identity theft. Credit card numbers, log-on User-Names, access codes, software license numbers on the other hand, are examples of semi-fixed-personal-identifiers that are not fixed for life, but the ones that can be better protected from abuse through procedures and practices covered in this document. Same procedures that are applied to fixed-for-life-identity-identifiers are also applicable to such semi-fixed-identity-identifiers. This document references both types when it refers to the word "identity-identifier(s)".

2. A trustee organization takes a person's identity-identifier with one or more identity-passwords and makes a "complex-data-item" out of it by applying a "rule" between the two, thereby relating or commingling them together. The rule can be as simple as a one-to-one association between the two data items, a simple character concatenation of the two, or application of one or more complex encryption algorithms to the two identifiers in defining and making such a "complex-data-item". Therefore, to re-make and validate such a "complex-data-item", three pieces of information should be present:
   a. The same identity-identifier used.
   b. The same identity-password used.
   c. The same rule for commingling the two.
3. The trustee has two kinds of clients. They are named "personal clients", and "business clients". Personal clients are those individuals who would register with the trustee by filling up an application form, and would agree with the trustee's rules, procedures, and conditions of using its services; thus becoming "personal members" of the trustee organization. Personal members will perform all procedural steps specified by the "Personal Membership Terms and Conditions of Use" contract.
4. "Business clients" are those businesses, institutions, and/or organizations that become business members of the trustee organization and will accept, abide by and perform all procedural steps specified by "Business Membership Terms and Conditions of Use" contract. To receive authentication and verification services from the trustee, "Business members" must follow-up and abide by all of the procedures and rules set forth by the trustee in such a contract, and must be members in good-standing at the time of receiving services. The trustee is free to set and alter such policies and procedures based on its needs, and from time-to-time.
5. Authentication procedures vary depending upon which type of the identity-identifiers we are going to validate. Following is a description for major types.

A. Authenticating the Identity of a Person Based on Partial or a Full Social Security Number:
   1. A person becomes a "personal member" of a trustee organization by accepting its "Terms and Conditions of Use" contract, in addition to supplying the following information to the trustee:
      a. The person's full name.
      b. Address zip code, and/or contact information.
      c. Identity-password, or in this case a SsnPassword selected for the initial setup of the account.
      d. A master password phrase, word, and/or number for recalling and/or changing an existing SsnPassword on trustee's data-base.
      e. Any other information that the trustee may require.
   2. This person should pay for the membership dues with a credit card that bears the same name as the one being registered. This an authentication check in itself, provided the payment for membership dues should clear using this credit card, and if the person's identity has not been stolen already. For this and other reasons, a trustee may require for the person to produce one or more notarized proof-of-identity documents. Such identity bearing documents are also needed if a person is registering another person (such as his/her children) who do not have credit cards of their own, or in cases where the membership dues are being paid in cash or by other means that do not provide the trustee with sufficient proof of identity at the time of membership registration; also at any other time, should a trustee suspect an inaccuracy or if it finds a conflict in identity; ie: same identity that is being presented by more than one person. In such cases the trustee can ask such people to produce extra proof of identity and request a more elaborate identity check. Regardless of circumstances, a trustee can do this at any time, and/or cancel existing membership and/or refuse membership to anyone on either side altogether. This is done to protect people's well being, and can be reversed through a judicial order.
3. A trustee should provide a web or other types of interface through wired and wireless means and/or internet to enable a personal member to change his/her SsnPasswords at any time. Such an interface should be over a Secure Socket Layer Protocol (SSL) communication link if through the web, and/or other secure environments in order to protect member passwords against being broken into and/or compromised. Also, the trustee's facilities and interfaces must safeguard against theft of data while in transport to the trustee and while in trustee's data storage facilities.
4. Upon receiving membership information, fees, and identity-authentication of its member, a trustee may issue one or more SsnPasswords for the new member to use, or may let the new member to pick a SsnPassword through its web or other secure electronic interfaces. The trustee will then apply a concatenation, encryption, and/or association "rule" to the received full or partial SSN (identity-identifier) component, and an identity-password (in this case, SsnPassword), and will store the resultant "complex-data-item" with the person's full name and a "Reference-Number" in its data-base.
5. An organization or a business that is interested in authenticating a member person's identity has already been notified either directly by the member person being authenticated, or through credit bureau(s) that the person has a working SsnPassword with a trustee. In this case, and at the time of identity-authentication, a representative from the authenticating organization will call or otherwise contact the member person and ask for his/her name, full or partial SSN, and his/her SsnPassword in use. The member person can alternately supply the authenticating representative with both, his/her partial/full SSN and a current SsnPassword. The authenticator will make a temporary note of this information, and will then connect to the trustee's web site or other authentication interface of the trustee. To do this, the authenticator will logon to the trustee's web interface, or other trustee's facilities to authenticate the supplied (full/partial) SSN with its associated SsnPassword and other required information such as the person's full name and his/her address zip-code.
6. By entering the person's name, his/her SsnPassword, and optionally full or partial SSN and the person's address zip-code, a "business member organization" will receive a message in connection with the matching result of the information supplied by the person being authenticated, against the known information for the same person existing in trustee's data-base. The details of the above matching operation is as follows:
   a. After receiving the transmitted data, the trustee's computer will combine all of the supplied authentication data, and will turn those to a "complex-data-item" after the application of any encryption and/or commingling rules as set by the trustee.
   b. A definite clue to the identity of this person would result, should the "complex-data-item" resulting from all entered information match with the one on trustee's data base.
   c. The logic being the fact that no one else, but the true person would be aware of the person's SSN, full name, and then current SsnPassword that have been combined together.
   d. This holds true, provided the SsnPassword had been changed after its last use and possible storage by other organizations. The latter is of course a requirement that the personal members of the trustee have to abide by, if they want their identity protected through the use of this methodology.

7. A business or non-business organization, such as a bank, a school, a credit card company, a governmental agency, a car dealer, insurance agent, and the like that is anticipating to authenticate peoples' identity or to verify their credit history must first become a "business member" of the trustee organization by opening an account and agreeing to the trustee's "Terms and Conditions of Use for Business Members".

The process of opening an account accomplishes the following objectives:

a. It provides for the business-member organization to learn about and agree to a trustee's contract that lays down their mutual working relationship, terms, conditions, obligations, and liabilities.
   b. It provides the business-member organization with its own logon-id (User-Name) and password to use for authenticating the identity of its clients, using the trustee's authentication facilities and services.
   c. It provides for the trustee organization to have the opportunity to verify the legitimacy of business member organization before or after opening a business account.
   d. The trustee organization is able to enforce any laws, rules and procedures that is related to the confidentiality, safekeeping, and dissemination of social security numbers, and other sensitive identity information that are handed out to them by either the trustee, their clients, and other third parties; Here, a client is referred to a person whose identity or credit background needs to be verified by a business-member organization.
   e. The authentication process requires availability of facilities and operating funds for the trustee, so that the trustee organization would be able to charge for services rendered through such business accounts.
   f. It provides the trustee organization with the ability to amend or modify any of its terms and conditions of use that may have resulted as a result of change in legislation and governmental laws relating to the business.
   g. It provides the trustee with the means to terminate the services of an illegitimate or reckless business client that may endanger the security and well being of other members of the trustee in one form or another.

B. Verifying the Authenticity of a Charge Card Transaction:
   1. A business, institution, or organization wanting to cut down on its losses that result from "charge-backs" encourages its clients to become personal members in the trustee organization. Also, a person who wants to prevent unauthorized use of his/her credit card number would benefit from this service.
   2. The client/person would first need to register the charge card to be protected with the trustee. The procedure protects credit cards from misuse when used in on-line-shopping, or when shopping over the phone (mail orders).
   3. The person who owns a credit card to be protected, applies for membership to the trustee by completing the trustee's personal membership application form, and paying the registration dues online, using the same charge card it wants to register and get identity-passwords for.
   4. By running the charge, the trustee will find out if the membership charge goes through, in effect authenticating the person's name with his/her charge card number passing for payment. If further need for authentication arises, the trustee can contact the card's issuer bank. Also, if needed, the trustee can ask the person to send in a notarized affidavit of identity. A form for this can be downloaded from the trustee's web site, or can be included in the application package and mailed out.
   5. The trustee will generate a number of identity-passwords for this credit card member. Generated identity-passwords are then combined with the credit card number to create a "complex-data-item", in this case a "complex-credit-card-number" by applying a known "rule". A "rule" as such can be a simple data-to-data association, a concatenation of the two data fields as in claim 5, and/or the application of one or more data encryption routines to the data fields of claim 9. A digital file consisting of the generated identity-passwords, along with a "flag-indicator" of the rule used for this particular use will be stored on a removable read-only-memory/processor module and is mailed out to the personal member via traceable mail, or secure parcel post. The trustee will also send some instructions on how to use the custom made removable memory/processor and procedures to follow-through. For this, the new member may be guided to the trustee's web site for instructions, and other forms if necessary.
   6. The removable memory module mentioned above is custom made for the particular device or devices that it can plug into. This module may be plugged into a computer, PDA, cell-phone, cash register machine, gas-station pump, and/or similar electronic devices capable of reading and processing the data resident on the module, and to transmit the relevant identity-identifier, and identity-password(s) along with the value of the "rule flag" to processing facilities of the trustee for authentication or charging the credit card account via secure internet, wired, or wireless means.
   7. After the transmission of the above data to the trustee's processing facilities and execution of a successful charge transaction, a transaction number and a flag containing the result-code of the transaction will be sent back to the merchant's charge interface, and/or an email facility.
   8. At this point, the merchant can print a receipt and send/deliver the goods and services to the customer; in this case the person whose identity and credit card was authenticated and charged.

C. Authentication of Other Semi-Fixed-Personal-Identifiers:
   1. Credit card numbers, log-on User-Names, access codes, and software license numbers are some examples of semi-fixed-personal-identifiers. In section B, above, the procedure for authenticating and using a registered charge card was explained. A similar methodology is used to authenticate an access code, a software usage license, logon-id, personal electronic permits, and the like.
   2. A person whose identity is to be verified through this method submits a digital file containing his/her full or partial finger print, iris markings, or other biometric data to the trustee organization. Alternately the person can send a raw form of such an identity-marker to the trustee and allow the trustee to digitize them into one or more files for such a use.
   3. Upon receipt of such a request, the trustee generates numerous identity-passwords and loads them into a removable-processor-memory-module, along with the digital file containing the person's full or partial identity-identifier that was made available in the previous step, and a flag containing the value indicator of the "rule" used.
4. The trustee then packs and sends the processor-memory-module to the personal member who owns the identity-identifier via traceable mail, or secure parcel post. The trustee will also include some instructions on how to use the custom made removable processor-memory-module in the package.
5. The trustee subsequently loads the person's full or partial identity-identifier, and identity-passwords made in the previous steps into a secure data-base and applies a known "rule" to such data elements, and generates a "complex-data-item" for the personal member it is preparing for. The "complex-data-item" is also stored in the trustee's same data-base.
6. To authenticate a personal-identity, this data-base is later on accessed and interrogated through external secure internet links and/or other types of secure connection methods. A requesting outside connection sends in a stream of identity-data, one or more selected identity-passwords, and a flag containing the value indicator of the "rule" used, without sending in a "complex-data-item". The trustee's receiving computer facilities is capable of combining the received data into a "complex-data-item" for subsequent comparison with the same "complex-data-item" that is resident on its data-base for this person.
7. The removable processor-memory-module is a specially made gadget that is removable/pluggable into variety electronic devices such as computers, PDA's, cellular phones, door access mechanisms or similar devices. The removable processor-memory-module can be plugged into a computer/processor of sorts and is capable of capturing a user's finger print markings and/or converting the bio-metric markings into a digital file with or without the help of its host computer CPU. Upon plug in, the module adds in and sends one or more selected identity-passwords and a value of the "rule flag" it contains, along with the recently acquired identity-data in the form of digital stream to the trustee's computer for processing and comparison. The act of information transmission is done via the host device and/or the removable plugged in module. After such a transmission the owner of the memory module will remove the memory module from the device, so that his/her identity-identifier and identity-passwords may not be used by others. This person should safe-keep such removable password module for his/her own use, and should not lend it out for use of others. Should it be lost, the personal member should report its loss as soon as possible and should ask for a replacement module containing different passwords. In cases of reported loss of such modules, the trustee shall incorporate a "lost reference flag" to the affected "complex-data-item" in its data-base so that it can not be used any longer.
Similar removable processor-memory-modules can be manufactured for sensing, digitizing, capturing, and sending variety of biometric data types, along with identity-passwords, and a rule-flag values to a trustee's processing facilities for authentication of personal identity and/or user access permissions to software, locked premises, etc.
8. Upon the receipt of the transmitted 3 pieces of data, namely the identity-identifier, identity-password, and the rule, by trustee's computing facilities, the trustee can make a new "complex-data-item" out of the received data items, and can compare the resultant value of the transmitted "complex-data-item" with the one existing on its data-base for the registered personal member whose identity/access permissions is being authenticated.
9. Should there be a match between the transmitted value of the "complex-data-item" with the value of "complex-data-item" on trustee's data-base for this particular personal member, access/permission is granted, and a validation flag value is transmitted back to the user's device that initiated the authentication session, and/or to a pre-designated machine that uses access and/or permission information based on the value of a "device-indicator-flag".

D. Passing Along Identity Information without Social Security Number:
1. A person who does not want to expose his/her social security number to third party businesses, companies, and organizations will registers with a trustee organization and becomes its "personal member". As part of the registration process, the person will send for the necessary forms and contract information from the trustee or downloads them from its web site, and completes the application form with his/her name, contact information, and the last 4 digits of his/her social security number.
2. To become a personal member, a fee is also paid using the person's name and charge card information. This helps the trustee to validate a person's name if the person uses his/her own charge card. In this and other cases, the trustee may also require the original copy of an "affidavit of personal identity" signed by a notary public to be mailed to its address, along with any other supporting documents.
3. Once sure of the personal member's true identity, the trustee will issue a number of "SsnPassword(s)" for its new personal member. This number may depend on the amount the member is willing to spend, and can vary from 30 to 360 passwords. The passwords are to be linked to a full or partial social security number of the person applying. The trustee may require that all of the 9 digits of the social security to be used; otherwise the trustee can work with as little as the last 4 digits of SSN.
4. A person can submit his/her finger print, or other identity-identifiers to the trustee organization, with his/her partial SSN. The person may send a raw form of such an identity-marker to the trustee and allow the trustee to digitize it for use (in case b of step 10) when a person is present.
5. In the next step, the trustee will encrypt and store the issued "SsnPasswords" with the member's submitted identity-identifier along with a known "rule flag". As explained in other sections of this document, the identity-identifier(s), and "SsnPasswords" are encrypted and/or commingled into a "complex-data-item" using a known value of a "rule flag" and data.
6. Generated "complex-data-items" are stored in a removable-read-only-memory module and are sent to the new personal member via traceable mail or secure parcel post companies for delivery to the personal member.
7. The trustee will employ sufficient security precautions to keep its members' identity data from being broken into, while in transport and/or storage.
8. A business or non-business organization, like a bank, a credit card company, a governmental agency, a car dealer, and the like, who is planning to verify the credit history or the identity of a trustee's personal member must itself be a member of the trustee organization in "business member" capacity. The procedures for becoming a member, and the reasons why this kind of membership is needed and the need are already covered in previous sections.

9. Once accepted as a business member, the trustee will issue two data-strings to its new member; a "business-member-number", and a "business-member-rule-flag". A value of the "business-member-number", and a separate value for a "business-member-rule-flag" are embedded into a compiled computer program, named "the merchant-specific-software", and is sent to the new business member for its use.

10. When a business member needs to authenticate a personal member's identity or credit worthiness without the use of social security number, two scenarios are possible:
    a. Scenario a: A personal member is not physically present at the business member's location.
    b. Scenario b: A personal member is physically present at the business member's location.

11. In scenario a, where a personal member is not present, the procedures outlined in section A of this document, "Authenticating the identity of a person based on partial or a full social security number" are followed. In such cases, existence and usage of SsnPasswords guard against illegal usage of a member's social security number.

12. In scenario b, the personal member whose identity and/or credit worthiness is being verified transmits the data contained in the business member's machine from his/her removable-memory module in the form of "complex-data-item". The person also supplies his/her full name, as a minimum, to the authenticating representative/electronic machine. Alternate finger print or biometric authentication verification is also possible if the trustee has a record of such a biometric data in its data base for the person (see step 4 of this section).

13. The business member representative transfers the personal member's data out of removable memory module into a computer on which the "merchant-specific-software" has already been loaded. This software commands the computer to use only a specific "complex-data-item" out of the personal member's removable memory-processor module. The embedded "business-member-number", and "business-member-rule-flag" perform the following functions:
    a) The "business-member-number" ensures that only a single pre-determined value of a personal member's "complex-data-item" is selected and sent to the trustee's computing facilities for authentication and use.
    b) The value of "business-member-rule-flag" is contains an "expiry-date-indicator" after which the transmitted "complex-data-item" to the trustee is considered as "expired", and no longer "valid".

14. Once received by the trustee, the person's "complex-data-item" along with the business member's "business-member-number", and "business-member-rule-flag" data are processed and matched against the existing information in the trustee's data-base.

15. If and when the data are matched, and the business member's right to use its client's "complex-data-item" has been established and not expired, then the trustee's computer will relay the authenticated identity-information to a credit bureau for the retrieval and transmission of its "subscribed-to-credit-data" to the authenticating business member that is also a business client of the credit bureau.

16. Through using the above method a third party vendor/organization can authenticate the identity of a person (client) and to receive the person's credit records that it is subscribed to, without having to ask for person's social security number and other sensitive identity information.

Purpose of the Invention

As described in all of the 4 scenarios above, this invention protects a person's fixed identity-identifiers from exposure or use by third parties without the identity-owner's knowledge and/or participation. Business function takes place without the person having to expose his/her identity-identifiers to strangers. The invention also prevents a known identity-identifier, such as social security number, to be used without a pre-designated changeable password. The procedure outlined, in essence, places the identity-identifier's owner in the middle of authentication loop. It also provides a business to conduct a credit check on a person, or access to one's credit record, without the need to know a person's social security number. Through this invention, use of illegally obtained social security numbers or other identity-identifiers are blocked without the consent or participation of the identity-owner. With this invention, peoples' privacy is maintained, the business transactions can still go on, and the problem of identity theft will soon disappear.

The invention also makes possible to use the information recorded on a (USB) removable processor-memory device for identity-authentication when used along with one or a series of identity-passwords and a "rule flag" indicator that specifies the method of use and combining of the two data streams. A specially made removable processor-memory module that is capable of reading finger prints or other digital data, in conjunction with usage of identity-passwords and a rule flag; namely a "complex-data-item" out of a PDA/Cell Phone is the only gadget an identity-indicator-owner needs to use for a reliable identity-authentication, when present on authenticator's location.

I claim:

1. A method for authenticating the identity of a person who claims to be the owner of a certain identity identifier, said method implemented on a computer system having a processor configured to perform the steps of:
    enrolling an owner with a trustee via a computing system by having the owner provide personal information and at least one identity identifier to the trustee, the trustee performing the steps of:
        verifying the identity of the owner and ownership credentials;
        issuing at least one identity password to the owner through a secure interface, the identity password being changeable from time to time by the owner, and associated with the at least one identity identifier of the owner;
        applying a rule to the at least one identity identifier and at least one identity password to create a first complex-data-item; and
        storing the first complex-data-item in association with the personal information of the owner in a database;
    notifying a third party interested in authenticating an owner's identity, the owner performing the steps of:
        alerting the third party of the owner's enrollment with the trustee; and providing the third party with authentication data including the at least one identity identifier and at least one identity password associated with the at least one identity identifier;

the third party contacting the trustee and submitting the authentication data to the trustee;

verifying the remote third party's login credentials at the trustee's computer, the trustee's computer performing the steps of:

calculating a second complex-data-item by applying trustee's rule to the authentication data;

comparing the second complex-data-item to the first complex-data-item stored in the database; and granting access to the owner's personal information if the second complex-data-item matches the first complex-data-item;

wherein at the time of owner's transmission to the trustee, or a third party's computer facilities, only one of the owner's identity passwords is recalculated and altered based upon a pre-assigned rule and rule flag of the third party.

2. The method of claim 1, further comprising the step of:
the trustee programming, issuing and storing in its database a unique rule and associated rule flag to each third party for said third party and its business associates' sole use in the same or related business tasks.

3. The method of claim 1, wherein said step of notifying a third party interested in authenticating an owner's identity further comprises:

passing a complex-data-item from the owner to a third party instead of said authentication data; and exchanging between the third party and the trustee information using a complex-data-item wrapper instead of the authentication data.

4. The method of claim 1, further comprising the step of:
providing a unique second complex-data-item from the owner to each third party instead of the identity identifier, wherein each of said unique second complex-data-items is uniquely calculated using each third party's unique rule flag and the owner's identity password.

5. The method of claim 1, wherein:
the at least one identity identifier is an alphanumeric or digital representations of fixed-for-life identity identifiers, including at least one of an organization's Employer Identification Number (BIN), Tax Identification Number, an owner's social security number, fingerprint, iris pattern, earlobe patterns, DNA structures, biometric information, or other fixed for life unique identifiers.

6. The method of claim 1, wherein:
the at least one identity password includes at least one of alphanumeric or digital characters selected by the owner and changeable at any time by the owner.

7. The method of claim 1, wherein:
the rule includes at least one of a data to data association, a concatenation of two or more data fields or the application of at least one data encryption routine to two or more data fields.

8. The method of claim 1, wherein enrolling an owner further comprises the step of:
providing the owner with a master password, phrase, word or number for recalling or changing the at least one password.

9. The method of claim 1, further comprising:
requiring the third party to register and enroll with the trustee.

* * * * *